United States Patent
Fehri et al.

(10) Patent No.: US 11,411,794 B2
(45) Date of Patent: Aug. 9, 2022

(54) ARTIFICIAL NEUTRAL NETWORK PRECODING FOR MASSIVE MIMO SYSTEMS

(71) Applicant: Telefonaktiebolaget LM Ericsson (publ), Stockholm (SE)

(72) Inventors: Bilel Fehri, Montreal (CA); Pierre-Andre Laporte, Gatineau (CA); Mark Edward Rollins, Stittsville (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 17/421,172

(22) PCT Filed: Mar. 15, 2019

(86) PCT No.: PCT/IB2019/052140
§ 371 (c)(1),
(2) Date: Jul. 7, 2021

(87) PCT Pub. No.: WO2020/188316
PCT Pub. Date: Sep. 24, 2020

(65) Prior Publication Data
US 2022/0060364 A1    Feb. 24, 2022

(51) Int. Cl.
*H04B 7/04*   (2017.01)
*H04L 27/26*  (2006.01)
*G06N 3/04*   (2006.01)
*H04B 7/0413* (2017.01)

(52) U.S. Cl.
CPC ....... *H04L 27/2615* (2013.01); *G06N 3/04* (2013.01); *H04B 7/0413* (2013.01)

(58) Field of Classification Search
CPC ...... G06N 3/04; H04B 7/0413; H04B 7/0465; H04L 27/2615
See application file for complete search history.

(56) References Cited

U.S. PATENT DOCUMENTS

2016/0182136 A1    6/2016 Zhang et al.

FOREIGN PATENT DOCUMENTS

WO    WO 2020/092391    *    5/2020    ............... H04B 1/40

OTHER PUBLICATIONS

Miao Yao "sustainable green networking: exploiting degrees of freedom towards energy efficient 5G systems"; Wireless Networks, pp. 951-960; Nov. 25, 2017. (Year: 2017).*
International Search Report and Written Opinion dated Nov. 15, 2019 issued in PCT Application No. PCT/IB2019/052140, consisting of 16 pages.

(Continued)

*Primary Examiner* — Rahel Guarino
(74) *Attorney, Agent, or Firm* — Sage Patent Group

(57) ABSTRACT

A method and apparatus for artificial neural network precoding for massive MIMO systems are disclosed. In one embodiment, a method includes processing, by an artificial neural network, ANN, precoding engine, at least one input signal by 5 performing a low peak-to-average-power ratio, PAPR, precoding on the at least one input signal; and transmitting, via at least one antenna array having at least one antenna, at least one precoded output signal processed by the ANN precoding engine.

30 Claims, 11 Drawing Sheets

(56) References Cited

OTHER PUBLICATIONS

Hengyao Bao et al., Perturbation-Assisted PABR Reduction for Large-Scale MIMO-OFDM Systems Via ADMM: IEEE, Jul. 10, 2016, consisting of 9 pages.
Hengyao Bao et al., An Efficient Bayesian PABR Reduction Method for OFDM-Based Massive MIMO Systems; IEEE Transactions on Wireless Communications, vol. 15, No. 6, Jun. 2016, consisting of 13 pages.
Miao Yao, Sustainable Green Networking: Exploiting Degrees of Freedom Towards Energy-Efficient 5G Systems; Wireless Networks, Nov. 25, 2017; Springer Science + Business Media, LLC, consisting of 10 pages.
Christoph Studer et al., PAR-Aware Large-Scale Multi-User MIMO-OFDM Downlink; IEEE Journal on Selected Areas in Communications, vol. 31, No. 2, Feb. 2013, consisting of 11 pages.
Goodfellow et al., "Deep Learning" @ http://www.deeplearningbook.org; MIT Press 2016; pp. 196-200 and pp. 504-513.

* cited by examiner

ARTIFICIAL NEUTRAL NETWORK PRECODING FOR MASSIVE MIMO SYSTEMS

CROSS-REFERENCE TO RELATED APPLICATIONS

This application is a Submission Under 35 U.S.C. § 371 for U.S. National Stage Patent Application of International Application Number: PCT/IB2019/052140, filed Mar. 15, 2019 entitled "ARTIFICIAL NEUTRAL NETWORK PRECODING FOR MASSIVE MIMO SYSTEMS," the entirety of which is incorporated herein by reference.

TECHNICAL FIELD

Wireless communication and in particular, artificial neural network (ANN) precoding for massive multiple-input multiple-output (MIMO) antenna systems.

BACKGROUND

Large scale Multiple-Input Multiple-Output Orthogonal Frequency Division Multiplexing (MIMO-OFDM) systems promise significant capacity gains by using large adaptive antenna arrays with hundreds of elements. Reciprocity-based transmission provides the mechanism to achieve interference-free transmission between multiple users with these arrays using a Zero-Forcing (ZF) transmit precoding based on known channel state information (CSI). However, OFDM signaling exhibits a large Peak-to-Average Power Ratio (PAPR) requiring expensive linear Radio Frequency (RF) components and costly digital predistortion to manage and mitigate out-of-band radiation and non-linear signal distortions. Consequently, there is considerable interest in adopting low-PAPR signaling schemes for these systems.

Large scale MIMO-OFDM systems may offer substantial capacity gains by using large antenna arrays with hundreds of elements. However, because the involved telecommunication signals exhibit such large PAPR requiring expensive linear RF components and costly digital predistortion (DPD) to mitigate nonlinear signal distortions, research is being developed to reduce PAPR.

The ZF precoding system has the following attributes. A linear precoder $P_n^{ZF}$ performs digital beamforming individually on each tone, producing a vector $x_n \in \mathbb{C}^{M \times 1}$ from its layer-domain input information vector $s_n \in \mathbb{C}^{K \times 1}$. The precoder operates on total of $|\mathcal{T}|$ tones and the remaining $|\mathcal{T}^C|$ tones are unused and set to zero, where $|\mathcal{T}|+|\mathcal{T}^C|=N$. The precoder matrix $P_n^{ZF}$ is set to the "right pseudo-inverse" $H_n^\dagger$ of the MIMO channel matrix $H_n$ as shown in Equation 1 below. The precoder enforces the spatial constraints given in Equation 2 below such that tone $x_n=P_n s_n$ is received at the receiver (e.g., a User Equipment (UE) or wireless device (WD) in a Long Term Evolution (LTE) or 5G New Radio (NR) based system) as $H_n x_n = H_n P_n s_n = H_n H_n^\dagger s_n = s_n$, and so this ZF precoding scheme removes all multiple access interference between layers in the ideal case.

Equation 1: Zero-Forcing Precoding Solution $$P_n^{ZF}=H_n^\dagger=H_n^H(H_n H_n^H)^{-1}$$

$$P_n^{ZF}=H_n^\dagger=H_n^H(H_n H_n^H)^{-1}$$

Equation 2: Zero-Forcing Spatial Constraints for a Given Tone Index n.

$$s_n=H_n x_n, n \in \mathcal{T}$$

$$s_n=0^{K \times 1}, n \in \mathcal{T}^{C'}$$

Each of the N precoded vectors $x_n$ contains M samples to be distributed evenly across the M antenna branches of the transmitter. This "reordering" generates a new set of M vectors $a_m$ each containing N frequency-domain samples. These vectors are converted to time-domain vectors $b_m$ using respective Inverse Fast Fourier Transforms (IFFTs), and then serialized and prepended with a cyclic prefix (CP) according to conventional OFDM practice.

Time-domain clipping of each antenna branch signal reduces the PAPR from a large value (typically ~10 dB) to a value in the range of 5.0 to 9.0 dB. This process introduces signal distortion both in-band and out-of-band, typically characterized by its error vector magnitude (EVM) measured on each frequency-domain tone as a percentage between 3% and 20% depending on modulation format.

Recent research demonstrated that the large degrees of freedom enabled by large antenna arrays can be exploited to reduce PAPR significantly. This can be achieved by combining precoding, OFDM modulation, and PAPR reduction into a single optimization problem.

The considerable interest in adopting low-PAPR precoding schemes for massive MIMO systems was demonstrated with recent publications/references [1-4] as follows:

1. C. Studer and E. G. Larsson, "PAR-Aware Large-Scale Multi-User MIMO-OFDM Downlink", IEEE Journal on Selected Areas in Communications, Vol. 31, No. 2, February 2013.
2. H. Bao et. al., "An Efficient Bayesian PAPR Reduction Method for OFDM-Based Massive MIMO Systems", IEEE Transactions on Wireless Communications, Vol. 15, No. 6, June 2016.
3. H. Bao et. al, "An ADMM Approach for PAPR Reduction for Large-Scale MIMO-OFDM Systems", IEEE Transactions on Vehicular Technology, Vol. 67, No. 8, August 2018.
4. C. Studer et al., "Democratic Representations," CORR abs/1401.3420, Apr. 22, 2015, 43 pages.

Generally, some of the methods [1-2, 4] call for convex optimization techniques while others [2] use a Bayesian approach. Reference [1] proposes a method called "FITRA" that uses, at its core, a well-known convex optimization technique known as "fast iterative soft-thresholding (FISTA)". A Lagrange formulation trades off the peak power minimization $\|x\|_\infty$ against the spatial constraints $\|s-Hx\|_2^2$. The problem is solved by using a steepest descent approach applied to the gradient of g(x) and a soft thresholding applied to the proximal operator of $f(x)$ using the FISTA method. Simulations demonstrate the FITRA algorithm can achieve a PAPR in the range of (2,4) dB in 250 to 2000 iterations.

Reference [2] proposes a Bayesian framework that treats the signal as a random vector with suitable priors to promote a low PAPR solution. The solution is found using a variational expectation-maximization (EM) framework using generalized approximate message massing (GAMP).

Reference [3] proposes adding a perturbation signal Δx to each OFDM tone such that it reduces PAPR without any multiple access interference nor out-of-band radiation. A suitable perturbation signal is found using variable splitting and alternative direction method of multipliers (ADMM) techniques. The method is referred to as "PROXINF-ADMM". This method employs an identical set of spatial constraints as in FITRA. The resulting algorithm exhibits an outer loop that performs clipping and an inner loop that performs ADMM iterations to update the estimate of Δx.

Simulations demonstrate the PROXINF-ADMM algorithm can achieve a PAPR in the range of (2,4) dB in 20 to 200 iterations.

Reference [4] proposes a method called "Convex Reduction of Amplitudes (CRAM)" to solve directly for the low-PAPR OFDM signal using ADMM, rather than solving instead for an additive perturbation signal. This method employs an identical set of spatial constraints as in references [1], [2], and [3]. Variable splitting methods and ADMM are also applied here, however since the method solves for x directly rather than solving for the perturbation signal Δx, a different algorithm results with no inner loop, but only a single outer loop with a pair of proximal updates. Simulations demonstrate the CRAM algorithm can achieve a PAPR in the range of (2,4) dB in 4 to 8 iterations.

FIG. 1 illustrates a dual-constrained optimization problem as it applies to the methods/algorithms proposed in references [1, 3-4] (method [2], while iterative in nature, is not solving a convex optimization problem and is therefore not illustrated in FIG. 1). Two subspaces are illustrated in FIG. 1, each representing the set of solutions obeying to a given constraint. For low-PAPR precoding schemes, the two subspaces are the zero error vector magnitude (EVM)/adjacent cell leakage ratio (ACLR) constraint subspace and the low PAPR constraint subspace. Two search techniques are also illustrated in FIG. 1 as follows:

The solid lines illustrate the textbook solution for solving a dual constrained convex optimization problem.
   In fact, starting from an initial starting point (as indicated by the black dot in FIG. 1), a projection operation is defined to move to a point lying on the boundaries of the first subspace, the zero EVM/ACLR constraint subspace in this case. This projection is called the zero EVM/ACLR projection. This first projection operation on the first subspace is illustrated in FIG. 1 by the solid line numbered 1.
   Next, a second projection operation onto the low PAPR constraint subspace is defined and may be called a low PAPR projection. This projection is illustrated in FIG. 1 by the solid line numbered 2.
   This procedure is applied iteratively until convergence, as illustrated in FIG. 1.
The dashed lines illustrate accelerated convergence methods.
   These accelerated methods are very problem-dependent and are subject to continuous research. Methods proposed in references [1, 3-4] fall into this category. Note that these accelerated methods usually call for the same or similar projection operations as discussed above, namely the zero EVM/ACLR projection and the low PAPR projection. Besides the projection operations, methods [1, 3-4] also call for other unique and advanced mathematical tools to enable an accelerated convergence.

The low-PAPR precoding schemes proposed in references [1-4] are intended for use within a radio system as illustrated, for example, in FIG. 2. Starting from the symbols to be transmitted, $S_w$, zero forcing precoding is applied according to methods [1-4]. The reordering and the Inverse Fast Fourier Transform (IFFT) operation results in time-domain signals, $x_i$ with i=1 ... M, where M is the number of antenna branches. The low PAPR precoding methods [1-4] propose using the signals $x_i$ as a starting point for an iterative search of a low PAPR signal, as illustrated in FIG. 1. Following convergence, the identified signals $y_i$ with i=1 ... M, are outputted and transmitted.

Recently, in about 2017, inventors of this patent application researched, improved and generalized the method proposed in reference [4] being the state of the art technique when compared to [1-3]. Method [4] was generalized to handle Reciprocity Assisted Interference Transmission (RAIT), port reduction, multi-carrier multi-band transmission scenarios, etc.

Below is a description of zero EVM/ACLR projection as it applies respectively to a time domain division (TDD) multiplexing system and a frequency domain division (FDD) multiplexing system.

$$P_{TDD}=(I-H^H(HH^H)^{-1}H)$$

$$P_{FDD}=(I-CC^H),$$

where $P_{TDD}$ is the projection matrix for the TDD multiplexing case and $P_{FDD}$ is the projection matrix for the FDD case. H is the MIMO channel matrix estimation for the TDD case and C is the codebook precoding matrix for the FDD case. The $(\bullet)^H$ operator is the Hermitian transpose of a matrix.

In-depth mathematical description of zero EVM/ACLR projection and low PAPR projection can also be found in reference [4].

Even though some improvements have been made in the area of low-PAPR precoding, yet further improvements may be beneficial for massive MIMO systems.

SUMMARY

Some embodiments advantageously provide a method and system for artificial neural network (ANN) precoding for massive multiple-input multiple-output (MIMO) antenna systems.

According to one aspect of the present disclosure, a Multiple-Input Multiple-Output, MIMO, Orthogonal Frequency Division Multiplexing, OFDM, transmitter system is provided. The MIMO OFDM transmitter system comprises processing circuitry comprising an artificial neural network, ANN, precoding engine. The ANN precoding engine is configured to process at least one input signal by performing a low peak-to-average-power ratio, PAPR, precoding on the at least one input signal. The MIMO OFDM transmitter system comprises at least one antenna array having at least one antenna, the at least one antenna array configured to transmit at least one precoded output signal processed by the ANN precoding engine.

In some embodiments of this aspect, the ANN precoding engine is further configured to receive the at least one input signal and, as a result of performing the low PAPR precoding on the at least one input signal, output the at least one precoded output signal for transmission by the at least one antenna of the at least one antenna array. In some embodiments of this aspect, the ANN precoding engine is further configured to be trained using signals resulting from at least one low PAPR massive MIMO precoding algorithm. In some embodiments of this aspect, the ANN precoding engine is further configured to be trained using signals resulting from at least one iterative low PAPR massive MIMO precoding algorithm. In some embodiments of this aspect, the ANN precoding engine is further configured to be trained by running the at least one low PAPR massive MIMO precoding algorithm offline. In some embodiments of this aspect, the ANN precoding engine is configured to perform the low PAPR precoding on the at least one input signal in a non-iterative manner. In some embodiments of this aspect, the system further comprises a plurality of ANN precoding engines, each one of the plurality of ANN precoding engines configured to perform low PAPR precoding on corresponding input signals to provide precoded output transmit signals for each of the antennas. In some embodiments of this aspect, each antenna uses a set of ANN coefficients different from a set of ANN coefficients used by other antennas in the MIMO OFDM transmitter system. In some embodiments of this aspect, the ANN precoding engine is configured to process the at least one input signal by being further configured to process a plurality of input signals by performing the low PAPR precoding on each of the plurality of input signals simultaneously for each of the at least one antenna.

In some embodiments of this aspect, the ANN precoding engine comprises one of an autoencoder architecture and a Multi-Layer Perception, MLP, architecture. In some embodiments of this aspect, the at least one input signal of the ANN precoding engine is in one of a frequency-domain and a time-domain; and the at least one precoded output signal processed by the ANN precoding engine is in one of the frequency-domain and the time-domain. In some embodiments of this aspect, the processing circuitry is further configured to apply at least one of an error vector magnitude, EVM, and an adjacent cell leakage ratio, ACLR, projection after the at least one input signal is processed by the ANN precoding engine. In some embodiments of this aspect, the at least one of the EVM and the ACLR projection is applied to a system with known channel state information, CSI, of a channel on which the at least one antenna array is configured to transmit. In some embodiments of this aspect, the at least one of the EVM and the ACLR projection is applied using a null-space of codebook precoding matrices. In some embodiments of this aspect, the processing circuitry is further configured to perform a clip and filter operation after applying the at least one of the EVM and the ACLR projection. In some embodiments of this aspect, each of the low PAPR precoding, the at least one of the EVM and the ACLR projection and the clip and filter operation are performed only once for the transmitted at least one precoded output signal.

According to another aspect of the present disclosure, a method for a Multiple-Input Multiple-Output, MIMO, Orthogonal Frequency Division Multiplexing, OFDM, transmitter system is provided. The method comprises processing, by an artificial neural network, ANN, precoding engine, at least one input signal by performing a low peak-to-average-power ratio, PAPR, precoding on the at least one input signal. The method comprises transmitting, via at least one antenna array having at least one antenna, at least one precoded output signal processed by the ANN precoding engine.

In some embodiments of this aspect, the processing by the ANN precoding engine of the at least one input signal further comprises receiving, by the ANN precoding engine, the at least one input signal and, as a result of performing the low PAPR precoding on the at least one input signal, outputting the at least one precoded output signal for transmission by the at least one antenna of the at least one antenna array. In some embodiments of this aspect, the method further comprises training the ANN precoding engine using signals resulting from at least one low PAPR massive MIMO precoding algorithm. In some embodiments of this aspect, the method further comprises training the ANN precoding engine using signals resulting from at least one iterative low PAPR massive MIMO precoding algorithm. In some embodiments of this aspect, the method further comprises training the ANN precoding engine by running the at least one low PAPR massive MIMO precoding algorithm offline.

In some embodiments of this aspect, the performing the low PAPR precoding on the at least one input signal is performed in a non-iterative manner. In some embodiments of this aspect, the method further comprises performing, by a plurality of ANN precoding engines, low PAPR precoding on corresponding input signals to provide precoded output transmit signals for each of the antennas. In some embodiments of this aspect, each antenna uses a set of ANN coefficients different from a set of ANN coefficients used by other antennas in the MIMO OFDM transmitter system. In some embodiments of this aspect, the processing the at least one input signal by the ANN precoding engine further comprises processing a plurality of input signals by performing the low PAPR precoding on each of the plurality of input signals simultaneously for each of the at least one antenna.

In some embodiments of this aspect, the low PAPR precoding is performed on the at least one input signal using one of an autoencoder architecture and a Multi-Layer Perception, MLP, architecture. In some embodiments of this aspect, the at least one input signal of the ANN precoding engine is in one of a frequency-domain and a time-domain; and the at least one precoded output signal processed by the ANN precoding engine is in one of the frequency-domain and the time-domain. In some embodiments of this aspect, the method further comprises applying at least one of an error vector magnitude, EVM, and an adjacent cell leakage ratio, ACLR, projection after the at least one input signal is processed by the ANN precoding engine. In some embodiments of this aspect, the applying the at least one of the EVM and the ACLR projection further comprises applying the at least one of the EVM and the ACLR projection to a system with known channel state information, CSI, of a channel on which the at least one precoded output signal is transmitted. In some embodiments of this aspect, the applying the at least one of the EVM and the ACLR projection further comprises applying the at least one of the EVM and the ACLR projection using a null-space of codebook precoding matrices. In some embodiments of this aspect, the method further comprises performing a clip and filter operation after the applying the at least one of the EVM and the ACLR projection. In some embodiments of this aspect, each of the low PAPR precoding, the at least one of the EVM and the ACLR projection and the clip and filter operation are performed only once for the transmitted at least one precoded output signal.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

Figure 3:
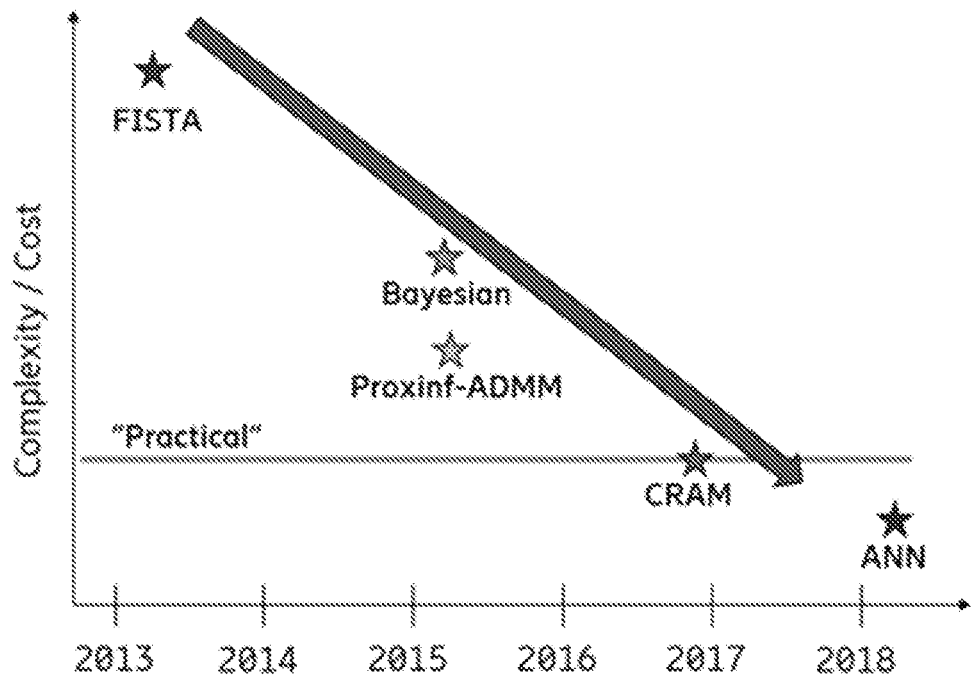
FIG. 3 is a comparative illustration of the complexities/cost of different low-PAPR precoding techniques.

The low-PAPR precoding methods proposed in references [1-4] enable an incremental reduction of the complexity of implementing low-PAPR massive-MIMO precoding. FIG. 3 presents a comparative illustration of the complexity for each algorithm. As can be seen in FIG. 3, while algorithms [1-3] (FISTA, Bayesian and Proxinf-ADMM, respectively) are clearly an academic exercise due to their significant complexity burden (being well above the "Practical" line), CRAM [4] is regarded as lying within the limits of practicality, although barely. The fifth star shown towards the bottom of the graph in FIG. 3, called ANN, represents the technique provided in the present disclosure, as will be explained in more detail below.

Methods [1-4] described above call for an iterative computation of different mathematical quantities (depending on the respective methods). Below is a table, Table 1, summarizing the required number of iterations for each methods [1-4].

TABLE 1

Number of iterations per low-PAPR precoding method.

| Method | Number of iterations |
| --- | --- |
| FISTA | 2000 |
| Bayesian | 200 |
| Proxinf-ADMM | 100 |
| CRAM | 5 |

Although each method's iteration includes different mathematical operations, and hence results in different complexity, they all present the same engineering dilemma. A designer will have to decide whether to 1) implement one iteration in hardware and let the software loop through it iteratively (hence reducing the hardware complexity of the solution while significantly affecting its throughput), or 2) to unroll the loop and provision separate hardware for each iteration (hence solving the throughput issue at the cost of further increasing the hardware complexity).

Another main issue of such iterative methods proposed in references [1-4] is that the methods cannot be parallelized, meaning that the output of a previous iteration is needed as an input of the subsequent iteration. This results in high computational latency, hindering the practical application of such methods in conjunction with low-latency transmission standards (especially with $5^{th}$ Generation (5G) technology requirements).

Accordingly, some embodiments of the solution proposed in the present disclosure eliminates the iterative approach adopted in methods [1-4] to avoid the complexity versus throughput dilemma and the latency penalty of such iterative methods, as discussed above. Instead, a pattern-based approach is proposed in the present disclosure, in which some embodiments may be summarized as follows.

1. Initially, a low-PAPR precoding method is run, including, but not limited to, methods [1-4]. The input signals, $x_i$ with i=1 . . . M, and the output signals, $y_i$ with i=1 . . . M, are recorded. In one embodiment, several low-PAPR precoding methods are run in parallel and their input and output signals are pooled together and recorded.
2. Next, using these input and output signals, an ANN precoding engine is trained.
3. Finally, the trained ANN precoding engine is used to implement a low-PAPR precoding method in an antenna system.

In some embodiments of the disclosed techniques, both the low-PAPR precoding method and the ANN engine training may be run offline, meaning both may be run during the radio design phase in a computer and actually implemented in a radio system after the ANN engine training. As a result, in some such embodiments, only the ANN precoding block may be implemented in an actual radio system. It is however contemplated that other embodiments may implement the low-PAPR precoding method and/or the ANN engine training online in a radio system.

Advantageously, it has been found that the complexity/latency of the ANN precoding block configured according to the techniques in the present disclosure is significantly reduced compared to any of the methods [1-4]. Based on sizing estimates, the proposed solution reduces both the hardware complexity and latency by about 80% in comparison to the methods proposed in reference [4], which are considered as the state of the art techniques for low-PAPR precoding.

Before describing in detail exemplary embodiments, it is noted that the embodiments reside primarily in combinations of apparatus components and processing steps related to artificial neural network (ANN) precoding for massive multiple-input multiple-output (MIMO) antenna systems. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), relay node, integrated access and backhaul (IAB), donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node.

The network node may include a Multiple-Input Multiple-Output, MIMO, Orthogonal Frequency Division Multiplexing, OFDM, transmitter system configured according to the techniques in the present disclosure.

In some embodiments, the non-limiting terms wireless device (WD) or a user equipment (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device etc.

The WD may be configured to receive, demodulate and/or decode the transmissions transmitted by the network node according to the techniques in the present disclosure.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), IAB, relay node, access point, radio access point, Remote Radio Unit (RRU) Remote Radio Head (RRH).

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Figure 4:
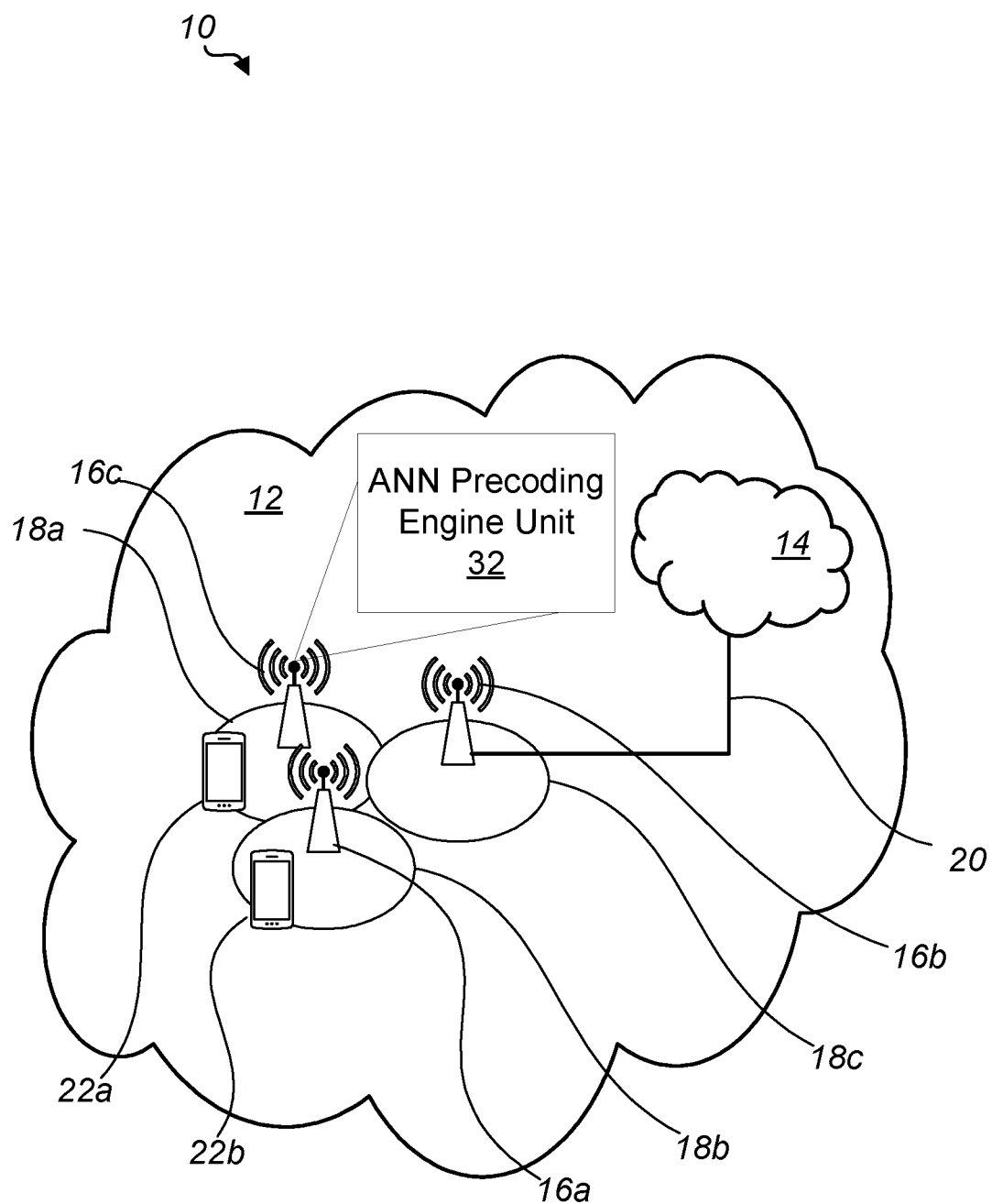
FIG. 4 is a schematic diagram of an exemplary network architecture illustrating a communication system which may implement the low-PAPR precoding techniques according to the principles in the present disclosure.

Referring again to the drawing figures, in which like elements are referred to by like reference numerals, there is shown in FIG. 4 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of network nodes 16a, 16b, 16c (referred to collectively as network nodes 16), such as NBs, eNBs, gNBs or other types of wireless access points, each defining a corresponding coverage area 18a, 18b, 18c (referred to collectively as coverage areas 18). Each network node 16a, 16b, 16c is connectable to the core network 14 over a wired or wireless connection 20. A first wireless device (WD) 22a located in coverage area 18a is configured to wirelessly connect to, or be paged by, the corresponding network node 16c. A second WD 22b in coverage area 18b is wirelessly connectable to the corresponding network node 16a. While a plurality of WDs 22a, 22b (collectively referred to as wireless devices 22) are illustrated in this example, the disclosed embodiments are equally applicable to a situation where a sole WD is in the coverage area or where a sole WD is connecting to the corresponding network node 16. Note that although only two WDs 22 and three network nodes 16 are shown for convenience, the communication system may include many more WDs 22 and network nodes 16.

Also, it is contemplated that a WD 22 can be in simultaneous communication and/or configured to separately communicate with more than one network node 16 and more than one type of network node 16. For example, a WD 22 can have dual connectivity with a network node 16 that supports LTE and the same or a different network node 16 that supports NR. As an example, WD 22 can be in communication with an eNB for LTE/E-UTRAN and a gNB for NR/NG-RAN.

A network node 16 comprises the MIMO-OFDM transmitter system configured according to the techniques in the present disclosure. The network node 16 is configured to include an ANN precoding engine unit 32 which is configured to process at least one input signal by performing a low peak-to-average-power ratio, PAPR, precoding on the at least one input signal. The network node 16 comprises at least one antenna array having at least one antenna, the at least one antenna array configured to transmit at least one precoded output signal processed by the ANN precoding engine. The terms "ANN precoding engine unit" and "ANN precoding engine" may in some embodiments be used herein interchangeably.

A wireless device 22 is configured to receive, demodulate and/or decode the transmissions transmitted by the network node 16 according to the techniques in the present disclosure.

Figure 1:
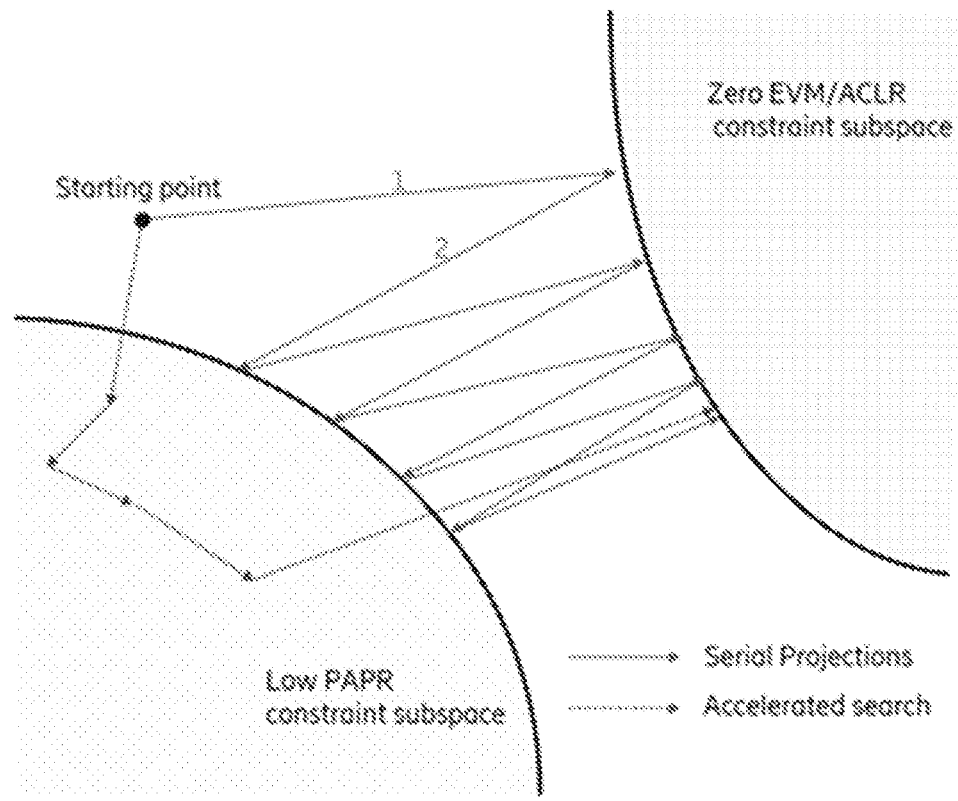
FIG. 1 illustrates an example of dual-constrained convex optimization techniques.
Figure 2:
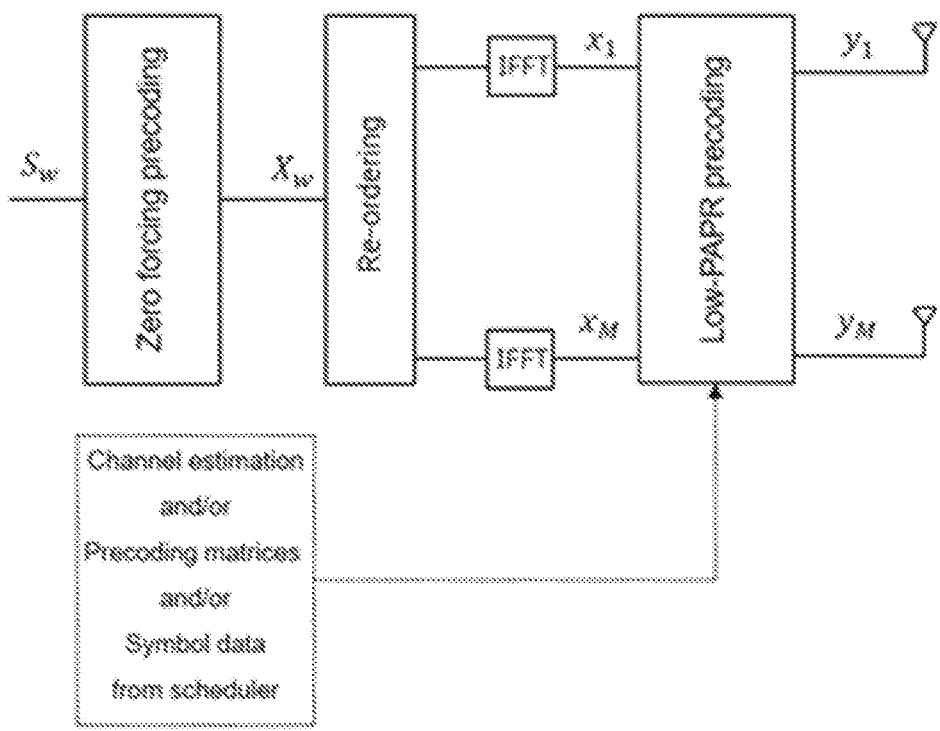
FIG. 2. illustrates an example of a low-PAPR precoding technique used in an antenna array system.

Example implementations, in accordance with an embodiment, of the WD 22 and the network node 16 discussed in the preceding paragraphs will now be described with reference to FIG. 2. In a communication system 10, a network node 16 provided in a communication system 10 and including hardware 58 enabling it to communicate with the WD 22. The hardware 58 may include a communication interface 60 for setting up and maintaining a wired or wireless connection with an interface of a different communication device of the communication system 10, as well as a radio interface 62 for setting up and maintaining at least a wireless connection 64 with a WD 22 located in a coverage area 18 served by the network node 16. The radio interface 62 may be formed as or may include, for example, one or more RF transmitters, one or more RF receivers, and/or one or more RF transceivers.

In the embodiment shown, the hardware 58 of the network node 16 further includes processing circuitry 68. The processing circuitry 68 may include a processor 70 and a memory 72. In particular, in addition to or instead of a processor, such as a central processing unit, and memory, the processing circuitry 68 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 70 may be configured to access (e.g., write to and/or read from) the memory 72, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

In some embodiments, network node 16 includes a MIMO-OFDM transmitter system. In some embodiments, the MIMO-OFDM transmitter system include the processing circuitry 68 and the radio interface 62, which radio interface 62 may include at least one antenna array (e.g., massive MIMO antenna array(s)).

The network node 16 further has software 74 stored internally in, for example, memory 72, or stored in external memory (e.g., database, storage array, network storage device, etc.) accessible by the network node 16 via an external connection. The software 74 may be executable by the processing circuitry 68. The processing circuitry 68 may be configured to control any of the methods and/or processes described herein and/or to cause such methods, and/or processes to be performed, e.g., by network node 16. Processor 70 corresponds to one or more processors 70 for performing network node 16 functions described herein. The memory 72 is configured to store data, programmatic software code and/or other information described herein. In some embodiments, the software 74 may include instructions that, when executed by the processor 70 and/or processing circuitry 68, causes the processor 70 and/or processing circuitry 68 to perform the processes described herein with respect to network node 16. For example, processing circuitry 68 of the network node 16 may include ANN precoding engine unit 32 configured to process at least one input signal by performing a low peak-to-average-power ratio, PAPR, precoding on the at least one input signal. The network node 16 may include at least one antenna array 62 having at least one antenna, the at least one antenna array 62 configured to transmit at least one precoded output signal processed by the ANN precoding engine 32.

In some embodiments, the ANN precoding engine 32 is further configured to receive the at least one input signal and, as a result of performing the low PAPR precoding on the at least one input signal, output the at least one precoded output signal for transmission by the at least one antenna of the at least one antenna array 62. In some embodiments, the ANN precoding engine 32 is further configured to be trained using signals resulting from at least one low PAPR massive MIMO precoding algorithm. In some embodiments, the ANN precoding engine 32 is further configured to be trained using signals resulting from at least one iterative low PAPR massive MIMO precoding algorithm. In some embodiments, the ANN precoding engine 32 is further configured to be trained by running the at least one low PAPR massive MIMO precoding algorithm offline. In some embodiments, the ANN precoding engine 32 is configured to perform the low PAPR precoding on the at least one input signal in a non-iterative manner. In some embodiments, the network node 16 further comprises a plurality of ANN precoding engines 32, each one of the plurality of ANN precoding engines 32 configured to perform low PAPR precoding on corresponding input signals to provide precoded output transmit signals for each of the antennas 62. In some embodiments, each antenna 62 uses a set of ANN coefficients different from a set of ANN coefficients used by other antennas 62 in the MIMO OFDM transmitter system.

In some embodiments, the ANN precoding engine 32 is configured to process the at least one input signal by being further configured to process a plurality of input signals by performing the low PAPR precoding on each of the plurality of input signals simultaneously for each of the at least one antenna 62. In some embodiments, the ANN precoding engine 32 comprises one of an autoencoder architecture and a Multi-Layer Perception, MLP, architecture. In some embodiments, the at least one input signal of the ANN precoding engine 32 is in one of a frequency-domain and a time-domain; and the at least one precoded output signal processed by the ANN precoding engine 32 is in one of the frequency-domain and the time-domain. In some embodiments, the processing circuitry 68 is further configured to apply at least one of an error vector magnitude, EVM, and an adjacent cell interleakage ratio, ACLR, projection after the at least one input signal is processed by the ANN precoding engine 32. In some embodiments, the at least one of the EVM and the ACLR projection is applied to a system with known channel state information, CSI, of a channel on which the at least one antenna array 62 is configured to transmit. In some embodiments, the at least one of the EVM and the ACLR projection is applied using a null-space of codebook precoding matrices. In some embodiments, the processing circuitry 68 is further configured to perform a clip and filter operation after applying the at least one of the EVM and the ACLR projection. In some embodiments, each of the low PAPR precoding, the at least one of the EVM and the ACLR projection and the clip and filter operation are performed only once for the transmitted at least one precoded output signal.

The communication system 10 further includes the WD 22 already referred to. The WD 22 may have hardware 80 that may include a radio interface 82 configured to set up and maintain a wireless connection 64 with a network node 16 serving a coverage area 18 in which the WD 22 is currently located. The radio interface 82 may be formed as or may include, for example, one or more RF transmitters, one or more RF receivers, and/or one or more RF transceivers.

The hardware 80 of the WD 22 further includes processing circuitry 84. The processing circuitry 84 may include a processor 86 and memory 88. In particular, in addition to or instead of a processor, such as a central processing unit, and memory, the processing circuitry 84 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 86 may be configured to access (e.g., write to and/or read from) memory 88, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 22 may further comprise software 90, which is stored in, for example, memory 88 at the WD 22, or stored in external memory (e.g., database, storage array, network storage device, etc.) accessible by the WD 22. The software 90 may be executable by the processing circuitry 84. The software 90 may include a client application 92. The client application 92 may be operable to provide a service to a human or non-human user via the WD 22. In providing the service to the user, the client application 92 may receive request data and provide user data in response to the request data. The client application 92 may interact with the user to generate the user data that it provides.

The processing circuitry 84 may be configured to control any of the methods and/or processes described herein and/or to cause such methods, and/or processes to be performed, e.g., by WD 22. The processor 86 corresponds to one or more processors 86 for performing WD 22 functions described herein. The WD 22 includes memory 88 that is configured to store data, programmatic software code and/or other information described herein. In some embodiments, the software 90 and/or the client application 92 may include instructions that, when executed by the processor 86 and/or processing circuitry 84, causes the processor 86 and/or processing circuitry 84 to perform the processes described herein with respect to WD 22. For example, the processing circuitry 84 of the wireless device 22 may be configured to receive, demodulate and/or decode the transmissions transmitted by the network node 16, such as, transmissions transmitted by the MIMO-OFDM transmitter system in the network node 16 with the ANN precoding engine 32.

Figure 5:
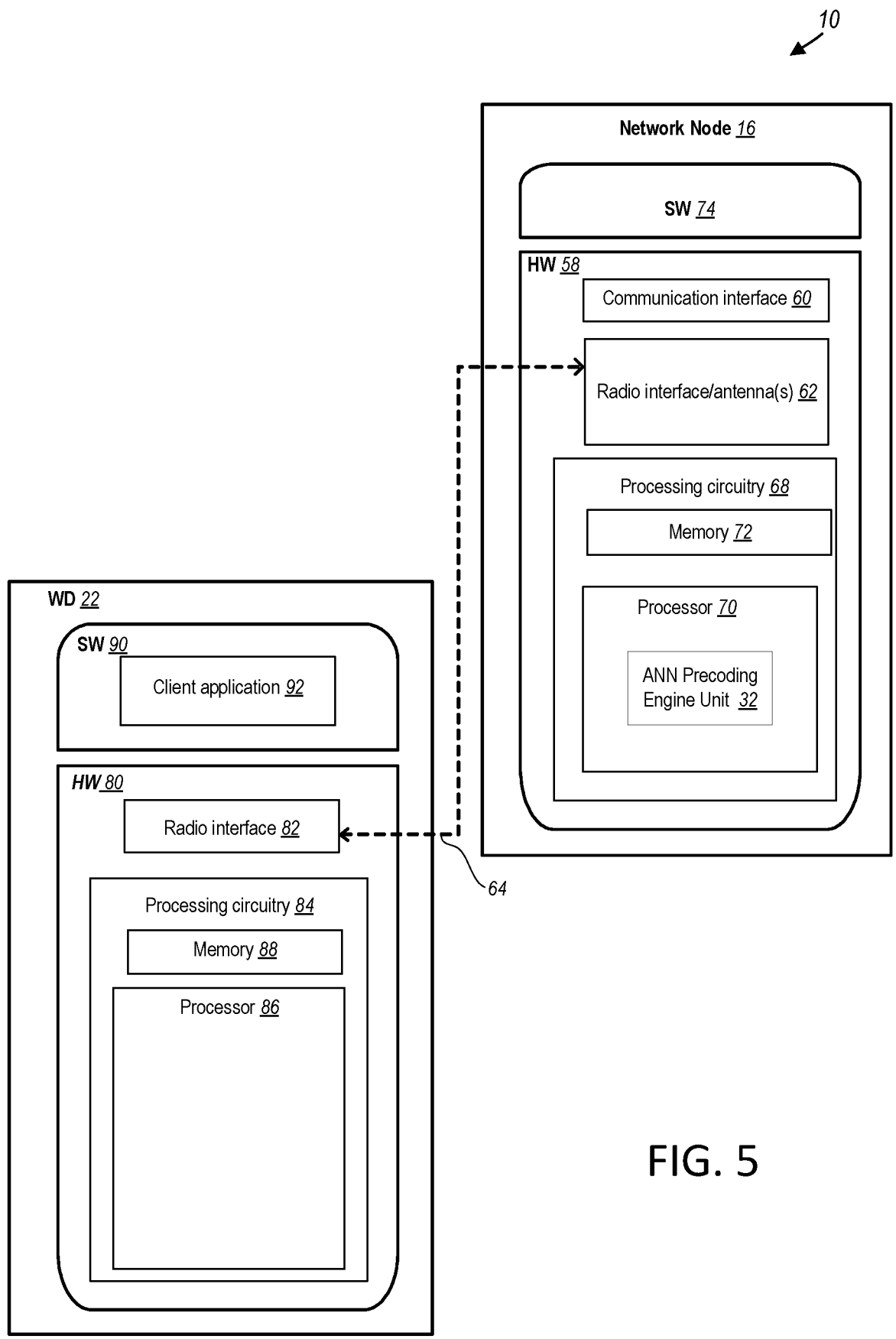
FIG. 5 is a block diagram of a network node in communication with a wireless device over an at least partially wireless connection according to some embodiments of the present disclosure.

In some embodiments, the inner workings of the network node 16 and WD 22 may be as shown in FIG. 5 and independently, the surrounding network topology may be that of FIG. 4.

In FIG. 5, the connection 64 between the wireless device 22 and the network node 16 is shown without explicit reference to any intermediary devices and the precise routing of messages via these devices. However, it should be understood that, in some embodiments, the connection 64 may not be direct, but may include intermediary devices not shown. Although, in some embodiments, the connection 64 may be a direct wireless connection.

Figure 6:
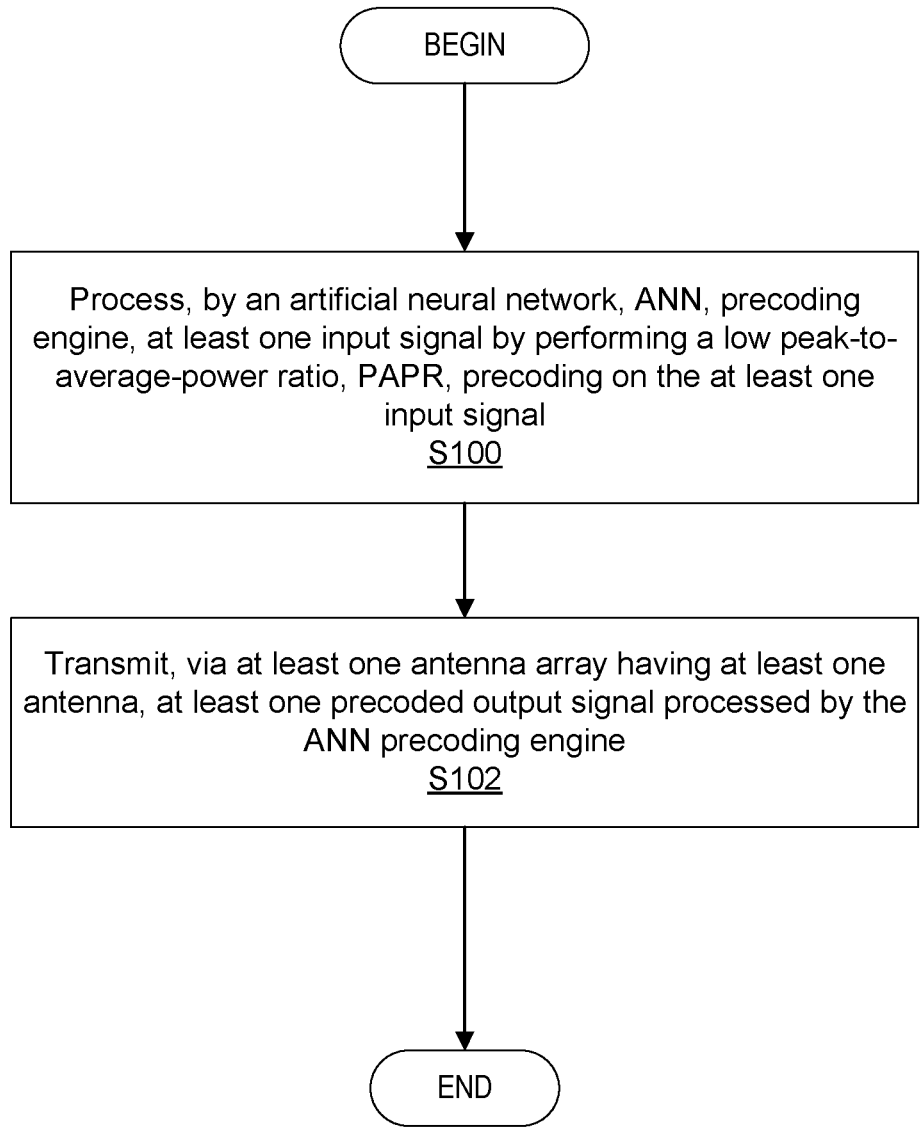
FIG. 6 is a flowchart of an exemplary process in a network node for ANN precoding engine according to some embodiments of the present disclosure.

FIG. 6 is a flowchart of an exemplary process in a network node 16 for ANN precoding for massive MIMO antennas, according to some embodiments of the present disclosure. One or more Blocks and/or functions and/or methods performed by the network node 16 may be performed by one or more elements of network node 16 such as by ANN precoding engine unit 32 in processing circuitry 68, processor 70, radio interface 62, etc. according to the example method. The example method includes processing (Block S100), by an artificial neural network, ANN, precoding engine 32, at least one input signal by performing a low peak-to-average-power ratio, PAPR, precoding on the at least one input signal. The example method includes transmitting (Block S102), via at least one antenna array 62 having at least one antenna, at least one precoded output signal processed by the ANN precoding engine 32.

In some embodiments, the processing by the ANN precoding engine 32 of the at least one input signal further comprises receiving, by the ANN precoding engine 32, the at least one input signal and, as a result of performing the low PAPR precoding on the at least one input signal, outputting the at least one precoded output signal for transmission by the at least one antenna 62 of the at least one antenna array. In some embodiments, the method further comprises training the ANN precoding engine 32 using signals resulting from at least one low PAPR massive MIMO precoding algorithm. In some embodiments, the method further comprises training the ANN precoding engine 32 using signals resulting from at least one iterative low PAPR massive MIMO precoding algorithm (e.g., one or more of methods [1-4] discussed herein above). In some embodiments, the method further comprises training the ANN precoding engine 32 by running the at least one low PAPR massive MIMO precoding algorithm offline. In some embodiments, the performing the low PAPR precoding on the at least one input signal is performed in a non-iterative manner. In some embodiments, the method further comprises performing, by a plurality of ANN precoding engines 32, low PAPR precoding on corresponding input signals to provide precoded output transmit signals for each of the antennas 62. In some embodiments, each antenna 62 uses a set of ANN coefficients different from a set of ANN coefficients used by other antennas 62 in the MIMO OFDM transmitter system.

In some embodiments, the processing the at least one input signal by the ANN precoding engine 32 further comprises processing a plurality of input signals by performing the low PAPR precoding on each of the plurality of input signals simultaneously for each of the at least one antenna 62. In some embodiments, the low PAPR precoding is performed on the at least one input signal using one of an autoencoder architecture and a Multi-Layer Perception, MLP, architecture. In some embodiments, the at least one input signal of the ANN precoding engine is in one of a frequency-domain and a time-domain; and the at least one precoded output signal processed by the ANN precoding engine is in one of the frequency-domain and the time-domain. In some embodiments, the method further comprises applying, such as via processing circuitry 68, at least one of an error vector magnitude, EVM, and an adjacent cell leakage ratio, ACLR, projection after the at least one input signal is processed by the ANN precoding engine 32. In some embodiments, the applying the at least one of the EVM and the ACLR projection further comprises applying the at least one of the EVM and the ACLR projection to a system with known channel state information, CSI, of a channel on which the at least one precoded output signal is transmitted. In some embodiments, the applying the at least one of the EVM and the ACLR projection further comprises applying the at least one of the EVM and the ACLR projection using a null-space of codebook precoding matrices. In some embodiments, the method further comprises performing, such as via processing circuitry 68, a clip and filter operation after the applying the at least one of the EVM and the ACLR projection. In some embodiments, each of the low PAPR precoding, the at least one of the EVM and the ACLR projection and the clip and filter operation are performed, such as via processing circuitry 68, only once for the transmitted at least one precoded output signal.

Having generally described some embodiments for artificial neural network (ANN) precoding for massive multiple-input multiple-output (MIMO) antenna systems, a more detailed description of some of the embodiments is provided below.

Figure 7:
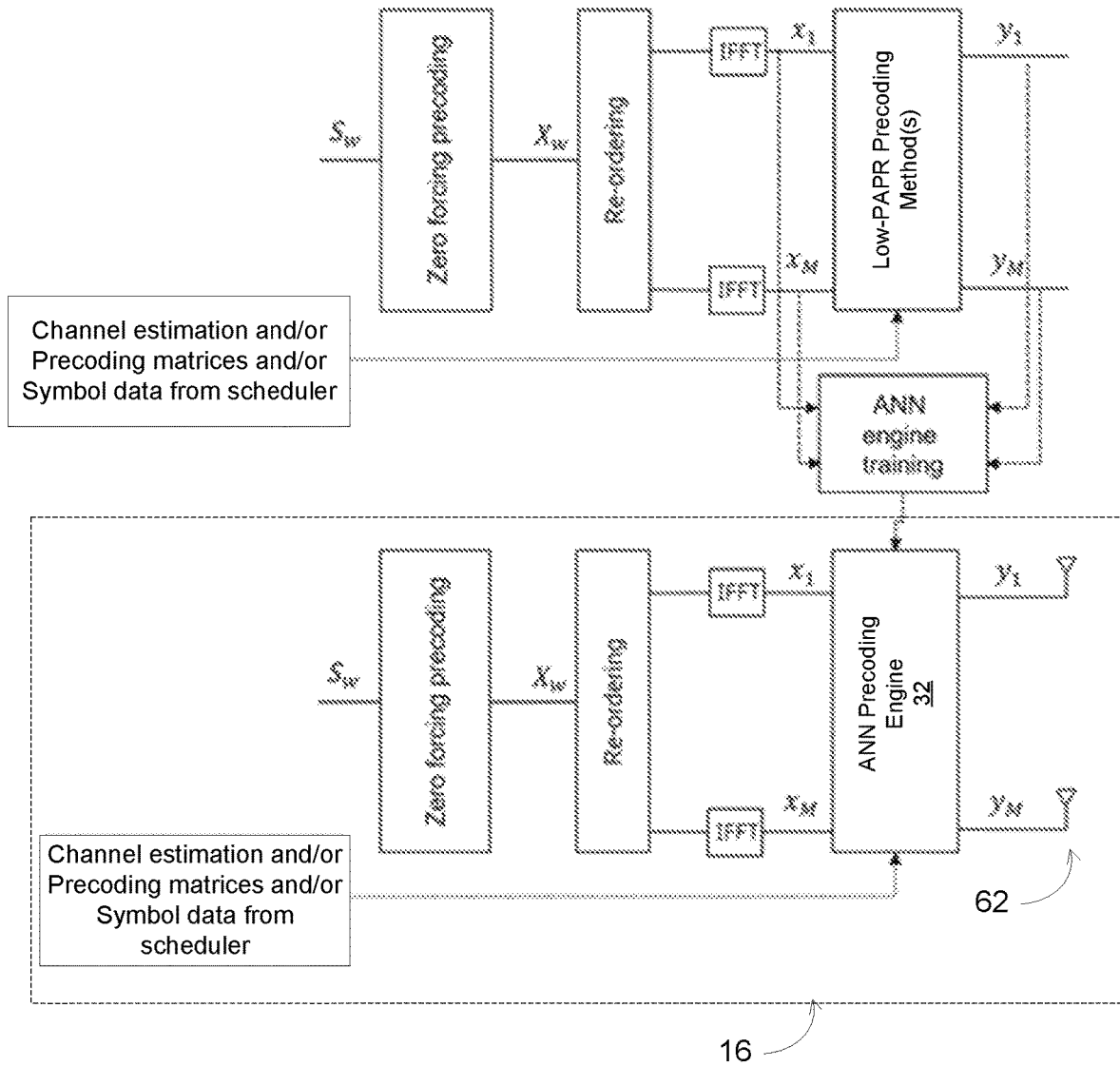
FIG. 7 illustrates ANN precoding training and implementation in an antenna array system according to some embodiments of the present disclosure.

Some embodiments propose a machine learning based low-PAPR precoding procedure, as described herein above. An example of the procedure is illustrated in the block diagram of FIG. 7. The procedure may include the following:

1. Initially, a low-PAPR precoding method is run, including but not limited to methods [1-4]. The input signals, $x_i$ with i=1 ... M, and the output signals, $y_i$ with i=1 ... M, are recorded. In one embodiment, several low-PAPR precoding methods are run in parallel and their input and output signals are pooled together.
2. Next, using the input and output signals, an ANN precoding engine 32 is trained.
3. Finally, the trained ANN precoding engine 32 is used to implement a low-PAPR precoding method in a radio system (e.g., network node 16). The low-PAPR precoding method implemented by the trained ANN precoding engine 32 may be a pattern-based low-PAPR precoding method (rather than iterative methods such as methods [1-4]).

In the network node 16, channel estimation (e.g., CSI data from WD 22) and/or precoding matrices (e.g., as indicated by a WD 22) and/or symbol data (e.g., from a scheduler) may be fed into the ANN precoding engine 32 in order to produce the appropriate beamformed, signal output(s), $y_i$ for transmission by the antenna(s) 62.

There are at least two main architectural candidates for an ANN precoding engine 32 in the radio system (e.g., network node 16), as follows:

1. The ANN precoding engine 32 comprises only one entity, which is essentially an artificial neural network.
2. The ANN precoding engine 32 comprises multiple signal processing operations. For example, in addition to the artificial neural network, an ANN precoding engine 32 may further include a zero EVM/ACLR projection, a low-PAPR projection, an FFT, an IFFT, a clip and filter operation, etc. Three examples are presented in FIGS. 8-10.

Figure 8:
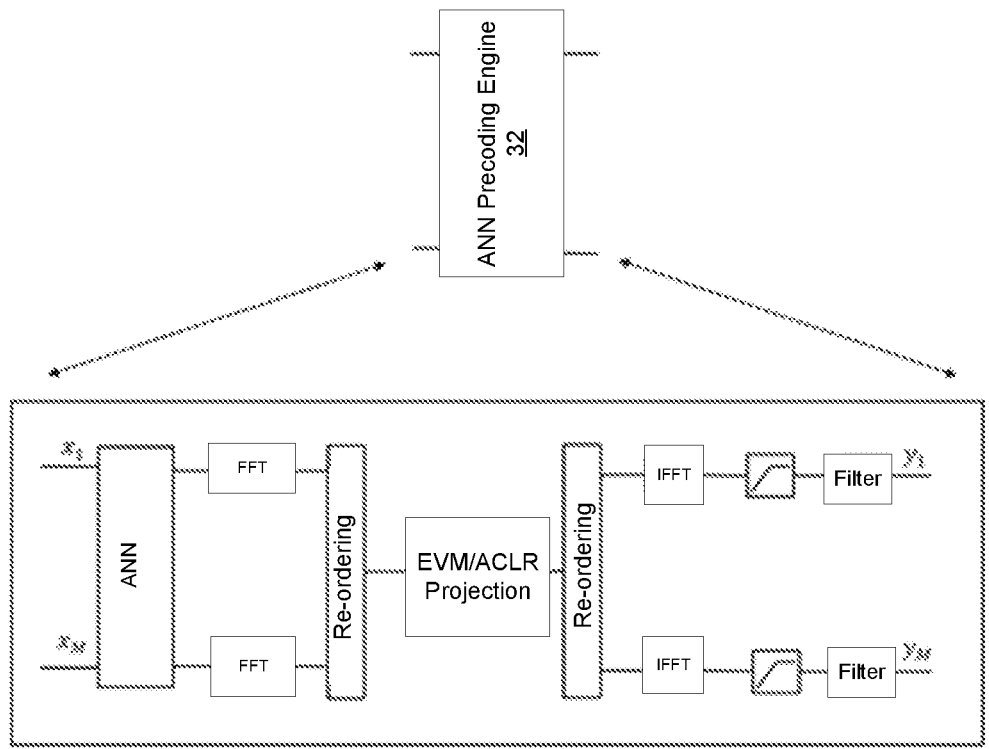
FIG. 8 illustrates a first example of an ANN precoding engine comprising multiple signal processing operations in addition to the artificial neural network according to one embodiment of the present disclosure.

In FIG. 8, an ANN block is followed by an FFT operation to convert each antenna stream to the frequency domain, a reordering operation to recover data for each tone, a zero EVM/ACLR projection, a reordering operation and an IFFT operation to revert the antenna streams back to the time domain and finally a conventional clip and filter operation.

Figure 9:
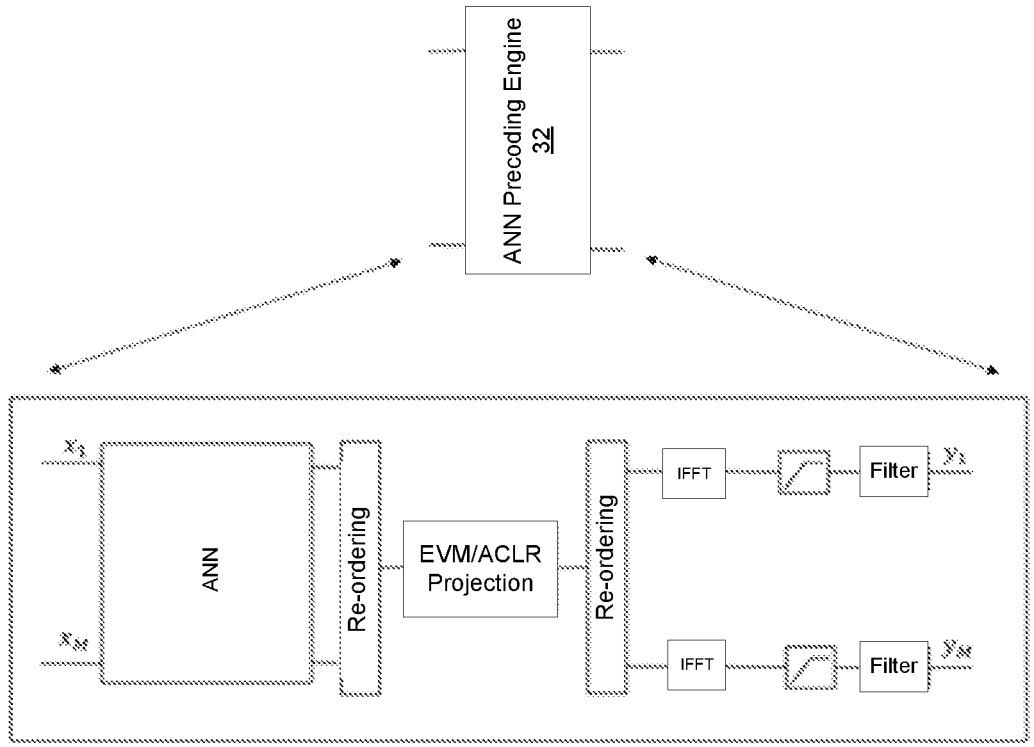
FIG. 9 illustrates a second example of an ANN precoding engine comprising multiple signal processing operations in addition to the artificial neural network according to another embodiment of the present disclosure.

FIG. 9 presents a similar architecture with the exception that the FFT operations of FIG. 8 are removed. In this specific example, the neural network inputs, $x_i$, are time domain signals while the outputs, $y_i$, are frequency domain signals. Equivalently, IFFT operations preceding the ANN precoding engine 32 could be removed so that the both the ANN inputs and outputs are frequency domain signals.

Figure 10:
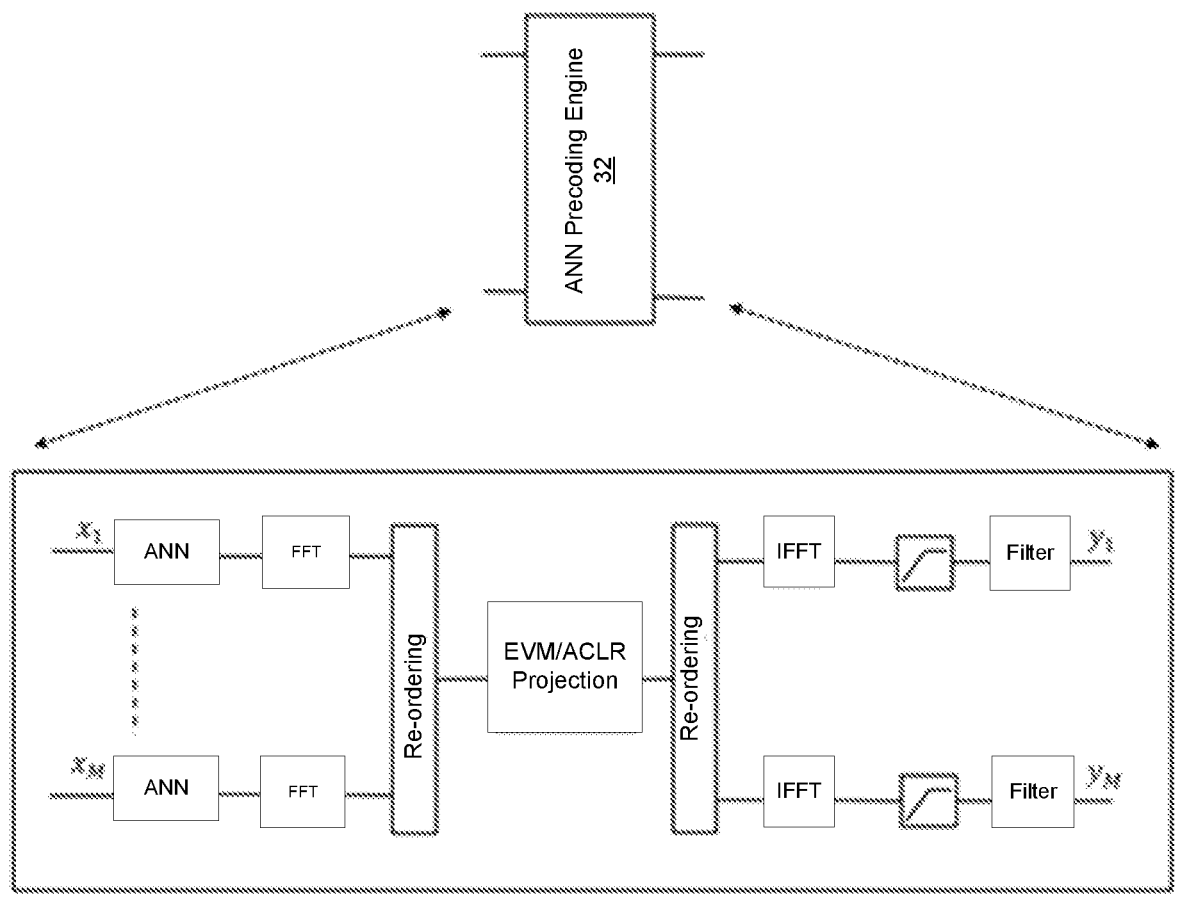
FIG. 10 illustrates a third example of an ANN precoding engine comprising multiple signal processing operations in addition to the artificial neural network according to yet another embodiment of the present disclosure.

FIG. 10 presents yet another variant architecture where a separate ANN precoding engine 32 is used per antenna stream instead of one multi-input multi-output ANN (as with the examples in FIGS. 8 and 9). Here too, the ANN precoding engines 32 inputs and outputs can be time domain and/or frequency domain signals.

Of note, the example ANN precoding engine 32 implementations in the present disclosure, as shown in FIGS. 7-10, illustrate the non-iterative aspect provided by at least some embodiments of the ANN precoding engine 32. Instead of using an iterative feedback loop, as with all of the existing low-PAPR methods [1-4], by training the ANN precoding engine 32 to recognize patterns associated with low-PAPR signals, a non-iterative low-PAPR method can be implemented by the ANN precoding engine 32; thereby providing a mechanism for reducing latency, as well as, reducing the complexity drawbacks of existing iterative approaches.

In alternative embodiments, the ANN precoding engine may be implemented in an iterative manner, but preferably with few iterations and even more preferably with less iterations that existing iterative approaches, as discussed above.

Figure 11:
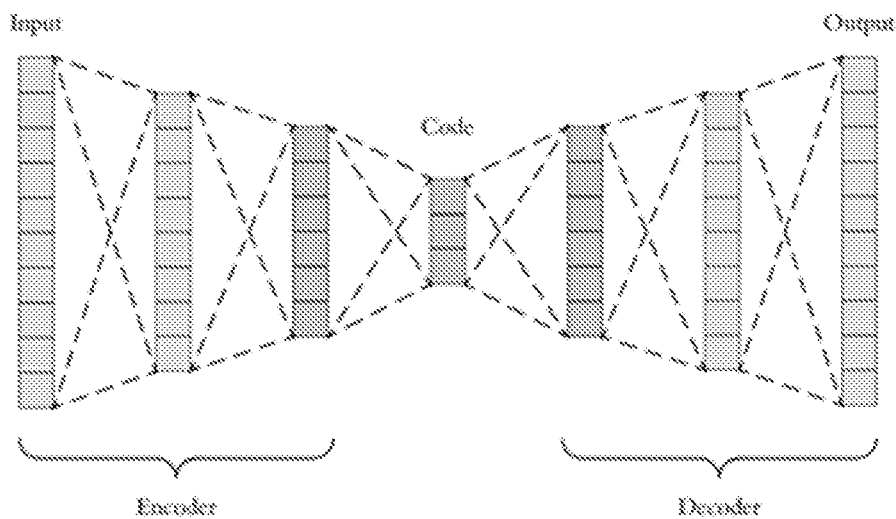
FIG. 11 illustrates an example architecture of the ANN engine according to some embodiments of the present disclosure.
Figure 12:
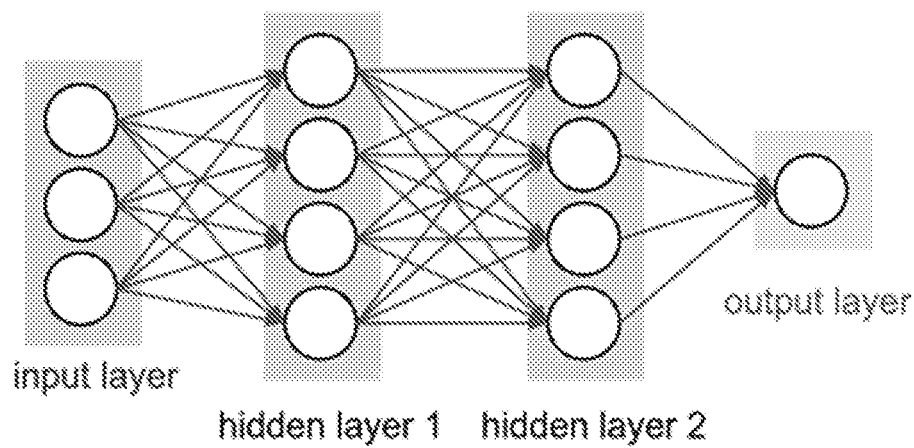
FIG. 12 illustrates yet another example architecture of the ANN engine according to some embodiments of the present disclosure.

Concerning the ANN engine structure itself (separate from any additional signal processing operations), multiple ANN designs may be considered. At least two different non-limiting architectures have been found to work with the teachings of the disclosure. FIGS. 11 and 12 present two candidate ANN architectures that have provided positive experimental results. FIG. 11 illustrates an autoencoder architecture, which is discussed generally in reference "Deep Learning," by Ian Goodfellow, Aaron Courville and Yoshua Bengio, MIT Press, November 2016 [5] (https://www.deeplearningbook.org/) pp. 500-522. As an example of its implementation according to the techniques in the present disclosure, consider an input signal x comprising 2048 points. The input layer of the neural network uses hence 2048 neurons. The output signal y comprises also 2048 points. Hence the output layer also uses 2048 neurons. The hidden layers however use a lesser number of neurons. As an example, the central layer (called the "code layer") may use 100 neurons, while the other layers may use anywhere between 500 and 1500 neurons.

FIG. 12 illustrates a Multi-Layer Perceptron (MLP), which is discussed generally in reference [5] pp. 193-209. Here, using the same example as above, an input and output signal comprises 2048 points each. With an MLP architecture, each point of the 2048 points is processed separately. An input $x(n)$, n=1 ... 2048 is presented at the input, along with the immediately preceding and following points, i.e., $x(n-1)$ and $x(n+1)$. In this case, the input layer of the MLP will call for three neurons. At the output, only one corresponding point is presented, i.e. $y(n)$. Hence, the output layer uses only one neuron. The hidden layers can use an arbitrary number of neurons. For example, 5 neurons for the first hidden layer and 3 neurons for the second hidden layer.

Although these ANN architectures have been shown as examples, it should be understood that the techniques disclosed herein for use of an ANN precoding engine 32 to identify low-PAPR signals for a radio system can be used with many different ANN architectures, in various different embodiments and implementations, and the present disclosure is not limited to just the examples shown.

Figure 13:
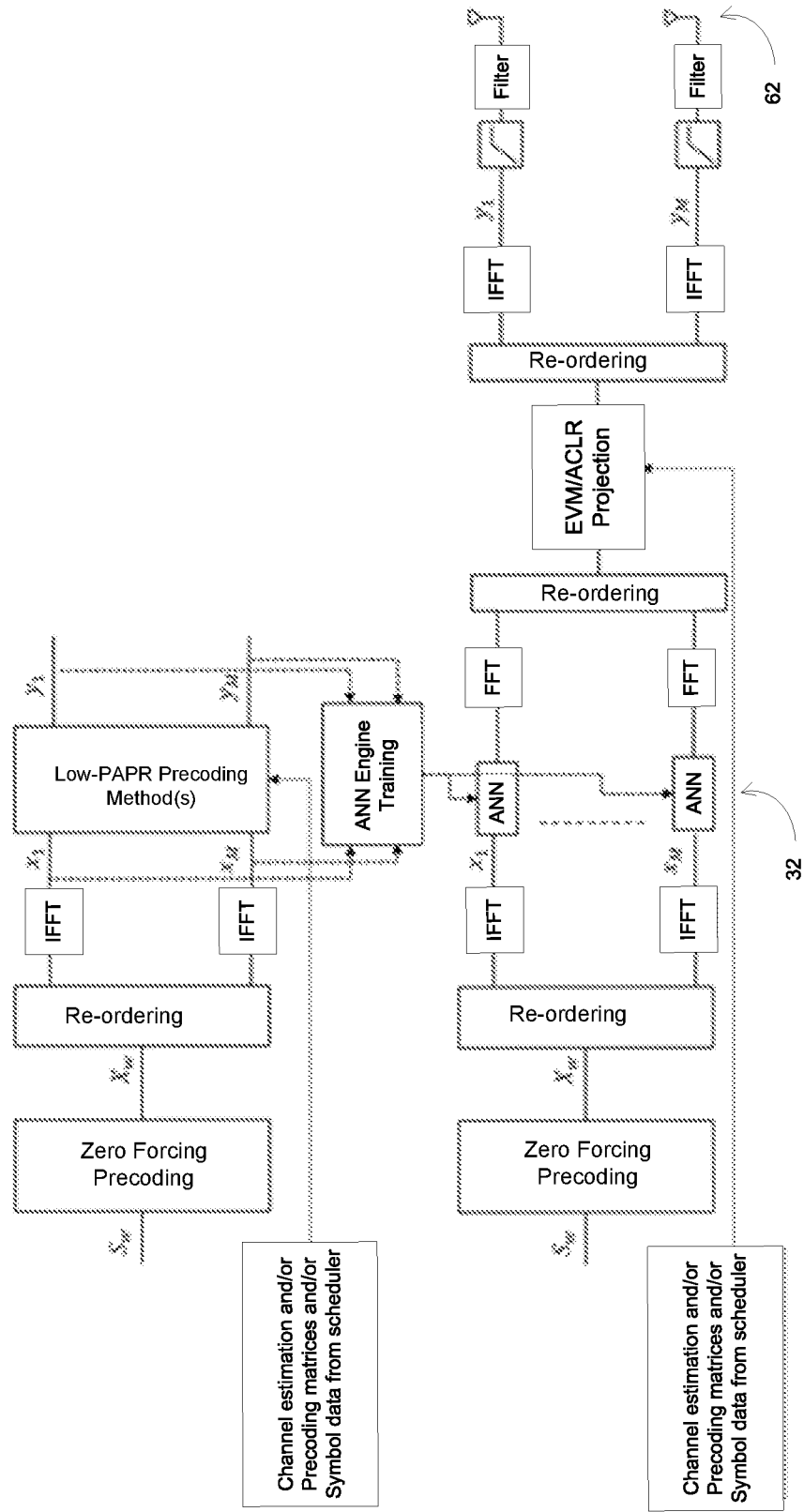
FIG. 13 illustrates an example of an ANN precoding engine training and deployment according to some embodiments of the present disclosure.

FIG. 13 presents an illustration of another example system, where a low-PAPR precoding system is run to generate input, $x_i$, and corresponding output, $y_i$, signals used thereafter to train an ANN precoding engine 32 and deploy the trained ANN precoding engine 32 in an online radio system, such as network node 16. FIG. 13 is similar to the system shown in FIG. 7, except that FIG. 13 illustrates an ANN precoding engine 32 for each antenna 62, according to one embodiment of the present disclosure. In addition, FIG. 13 illustrates each ANN precoding engine 32 followed by a corresponding FFT, a reordering operation, an EVM/ACLR projection, a second reordering operation, a corresponding IFFT operation, and a corresponding conventional clip and filter operation.

Some additional embodiments may include one or more of:

Embodiment 1:
An ANN precoding engine is used in an antenna array system.

Additional embodiments, as follows:
The ANN may be trained using the signals resulting from any low PAPR massive MIMO precoding algorithm [1-4];
The low PAPR massive MIMO precoding algorithm may be run offline;
The ANN may be trained offline;
Each antenna may use its own ANN engine;
Each antenna can use a different set of ANN architecture/coefficients;
One ANN can be applied to all antennas simultaneously;
The ANN engine has an MLP architecture;
The ANN engine has an autoencoder architecture;
The ANN can be followed by an EVM/ACLR projection;
The zero EVM/ACLR projections are applied to a system with known CSI information of the channel;
The zero EVM/ACLR projections are applied leveraging the null-space of the codebook precoding matrices;
The zero EVM/ACLR projection can be followed by a conventional clip/filter operation;
The ANN engine, zero EVM/ACLR projection, clip and filter may be run only once per input signal; and
The ANN/different projections operations may be run more than once (e.g., several times).

Abbreviations that may be used in the preceding description include:

| Abbreviation | Explanation |
| --- | --- |
| ANN | Artificial Neural Network |
| EVM | Error Vector Magnitude |
| ACLR | Adjacent Channel Leakage Ratio |
| MLP | Multi-Layer Perceptron |

-continued

| Abbreviation | Explanation |
| --- | --- |
| PAPR | Peak to Average Power Ratio |
| MIMO | Multiple-Input Multiple-Output |

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A Multiple-Input Multiple-Output, MIMO, Orthogonal Frequency Division Multiplexing, OFDM, transmitter system, the MIMO OFDM transmitter system comprising:
    processing circuitry comprising an artificial neural network, ANN, precoding engine, the ANN precoding engine configured to:
        process at least one input signal by performing a low peak-to-average-power ratio, PAPR, precoding on the at least one input signal; and
        be trained using signals resulting from at least one low PAPR massive MIMO precoding algorithm; and
    at least one antenna array having at least one antenna, the at least one antenna array configured to transmit at least one precoded output signal processed by the ANN precoding engine.

2. The MIMO OFDM transmitter system of claim 1, wherein the ANN precoding engine is further configured to receive the at least one input signal and, as a result of performing the low PAPR precoding on the at least one input signal, output the at least one precoded output signal for transmission by the at least one antenna of the at least one antenna array.

3. The MIMO OFDM transmitter system of claim 1, wherein the ANN precoding engine is further configured to be trained using signals resulting from at least one iterative low PAPR massive MIMO precoding algorithm.

4. The MIMO OFDM transmitter system of claim 1, wherein the ANN precoding engine is further configured to be trained by running the at least one low PAPR massive MIMO precoding algorithm offline.

5. The MIMO OFDM transmitter system of claim 1, wherein the ANN precoding engine is configured to perform the low PAPR precoding on the at least one input signal in a non-iterative manner.

6. The MIMO OFDM transmitter system of claim 1, further comprising a plurality of ANN precoding engines, each one of the plurality of ANN precoding engines configured to perform low PAPR precoding on corresponding input signals to provide precoded output transmit signals for each of the antennas.

7. The MIMO OFDM transmitter system of claim 6, wherein each antenna uses a set of ANN coefficients different from a set of ANN coefficients used by other antennas in the MIMO OFDM transmitter system.

8. The MIMO OFDM transmitter system of claim 1, wherein the ANN precoding engine is configured to process the at least one input signal by being further configured to:
    process a plurality of input signals by performing the low PAPR precoding on each of the plurality of input signals simultaneously for each of the at least one antenna.

9. The MIMO OFDM transmitter system of claim 1, wherein the ANN precoding engine comprises one of an autoencoder architecture and a Multi-Layer Perceptron, MLP, architecture.

10. The MIMO OFDM transmitter system of claim 1, wherein:
    the at least one input signal of the ANN precoding engine is in one of a frequency-domain and a time-domain; and
    the at least one precoded output signal processed by the ANN precoding engine is in one of the frequency-domain and the time-domain.

11. The MIMO OFDM transmitter system of claim 1, wherein the processing circuitry is further configured to apply at least one of an error vector magnitude, EVM, and an adjacent cell leakage ratio, ACLR, projection after the at least one input signal is processed by the ANN precoding engine.

12. The MIMO OFDM transmitter system of claim 11, wherein the at least one of the EVM and the ACLR projection is applied to a system with known channel state information, CSI, of a channel on which the at least one antenna array is configured to transmit.

13. The MIMO OFDM transmitter system of claim 11, wherein the at least one of the EVM and the ACLR projection is applied using a null-space of codebook precoding matrices.

14. The MIMO OFDM transmitter system of claim 11, wherein the processing circuitry is further configured to perform a clip and filter operation after applying the at least one of the EVM and the ACLR projection.

15. The MIMO OFDM transmitter system of claim 14, wherein each of:
    the low PAPR precoding,
    the at least one of the EVM and the ACLR projection, and
    the clip and filter operation
    are performed only once for the transmitted at least one precoded output signal.

16. A method for a Multiple-Input Multiple-Output, MIMO, Orthogonal Frequency Division Multiplexing, OFDM, transmitter system, the method comprising:
    processing, by an artificial neural network, ANN, precoding engine, at least one input signal by performing a low peak-to-average-power ratio, PAPR, precoding on the at least one input signal;
    training the ANN precoding engine using signals resulting from at least one low PAPR massive MIMO precoding algorithm; and transmitting, via at least one antenna array having at least one antenna, at least one precoded output signal processed by the ANN precoding engine.

17. The method of claim 16, wherein the processing by the ANN precoding engine of the at least one input signal further comprises:
receiving, by the ANN precoding engine, the at least one input signal and, as a result of performing the low PAPR precoding on the at least one input signal, outputting the at least one precoded output signal for transmission by the at least one antenna of the at least one antenna array.

18. The method of claim 16, further comprising training the ANN precoding engine using signals resulting from at least one iterative low PAPR massive MIMO precoding algorithm.

19. The method of claim 16, further comprising training the ANN precoding engine by running the at least one low PAPR massive MIMO precoding algorithm offline.

20. The method of claim 16, wherein the performing the low PAPR precoding on the at least one input signal is performed in a non-iterative manner.

21. The method of claim 16, further comprising performing, by a plurality of ANN precoding engines, low PAPR precoding on corresponding input signals to provide precoded output transmit signals for each of the antennas.

22. The method of claim 21, wherein each antenna uses a set of ANN coefficients different from a set of ANN coefficients used by other antennas in the MIMO OFDM transmitter system.

23. The method of claim 16, wherein the processing the at least one input signal by the ANN precoding engine further comprises:
processing a plurality of input signals by performing the low PAPR precoding on each of the plurality of input signals simultaneously for each of the at least one antenna.

24. The method of claim 16, wherein the low PAPR precoding is performed on the at least one input signal using one of an autoencoder architecture and a Multi-Layer Perceptron, MLP, architecture.

25. The method of claim 16, wherein:
the at least one input signal of the ANN precoding engine is in one of a frequency-domain and a time-domain; and
the at least one precoded output signal processed by the ANN precoding engine is in one of the frequency-domain and the time-domain.

26. The method of claim 16, further comprising applying at least one of an error vector magnitude, EVM, and an adjacent cell leakage ratio, ACLR, projection after the at least one input signal is processed by the ANN precoding engine.

27. The method of claim 26, wherein the applying the at least one of the EVM and the ACLR projection further comprises applying the at least one of the EVM and the ACLR projection to a system with known channel state information, CSI, of a channel on which the at least one precoded output signal is transmitted.

28. The method of claim 26, wherein the applying the at least one of the EVM and the ACLR projection further comprises applying the at least one of the EVM and the ACLR projection using a null-space of codebook precoding matrices.

29. The method of claim 17, further comprising performing a clip and filter operation after the applying the at least one of the EVM and the ACLR projection.

30. The method of claim 29, wherein each of:
the low PAPR precoding,
the at least one of the EVM and the ACLR projection, and
the clip and filter operation
are performed only once for the transmitted at least one precoded output signal.

* * * * *